United States Patent [19]

Dixit et al.

[11] 4,400,481

[45] Aug. 23, 1983

[54] FINISHER AND PRESERVER FOR LITHOGRAPHIC PLATES

[75] Inventors: Sunit S. Dixit, Naperville; William V. Stansky, Jr., Villa Park, both of Ill.

[73] Assignee: Richardson Graphics Company, Des Plaines, Ill.

[21] Appl. No.: 409,959

[22] Filed: Aug. 20, 1982

Related U.S. Application Data

[63] Continuation of Ser. No. 204,334, Nov. 5, 1980, abandoned.

[51] Int. Cl.³ ........................ C08L 5/00; C08L 93/00; B41N 3/00

[52] U.S. Cl. ...................................... 524/55; 523/177; 524/86; 524/104; 106/14.5; 101/463.1

[58] Field of Search .................... 523/177; 524/55, 77, 524/86, 104, 186, 501; 106/14.5; 101/463.1

[56] References Cited

U.S. PATENT DOCUMENTS

| | | | |
|---|---|---|---|
| 3,988,495 | 10/1976 | Lowey et al. | 428/343 |
| 4,033,919 | 7/1977 | Lawson | 524/555 |
| 4,078,493 | 3/1978 | Miyamoto | 101/450 |
| 4,213,887 | 7/1980 | Walls et al. | 524/310 |
| 4,253,999 | 3/1981 | Okishi | 524/48 |

FOREIGN PATENT DOCUMENTS

| | | |
|---|---|---|
| 1495522 | 12/1977 | United Kingdom . |
| 2010298 | 10/1978 | United Kingdom . |
| 1552833 | 9/1979 | United Kingdom . |

*Primary Examiner*—John Kight, III
*Assistant Examiner*—Nathan M. Nutter
*Attorney, Agent, or Firm*—Lockwood, Dewey, Alex & Cummings

[57] ABSTRACT

Finisher and preserver compositions are provided for desensitizing the non-image areas and protecting the image areas of lithographic plates of either the additive or the subtractive type that utilize substantially any type of exposure chemistry, the composition being useful for hand or machine finishing: they are also low in viscosity, are themselves unusually stable, preserve exposed plates for extended periods of storage time, and eliminate streaking on the plate to which they are applied to thereby substantially eliminate blinding problems during printing. Included in the finisher and preserver composition, which is a single phase aqueous system, are specific ratios of a blend of natural gum and synthetic hydrophilic resins, a preservative for the natural gum resin, a buffer system of phosphate and phosphoric acid, and a surfactant, with the balance being substantially entirely water.

17 Claims, No Drawings

FINISHER AND PRESERVER FOR LITHOGRAPHIC PLATES

This is a continuation of application Ser. No. 204,334, filed Nov. 5, 1980, now abandoned.

BACKGROUND AND DESCRIPTION OF THE INVENTION

This invention relates generally to compositions for finishing and preserving lithographic printing plates, more particularly to single-phase aqueous composition formulations that include as their hydrophilic component a blend of natural gum and synthetic resins in specific combination and admixture with a preservative, a buffer system, and a surfactant blend, each of which enhance the advantageous properties of the overall system while being compatible with each other and with the resin blend.

When a negative-acting lithographic plate is exposed to actinic radiation, the diazonium and/or polymer compositions coated thereon are hardened or insolubilized. When a positive-acting lithographic printing plate is exposed to actinic radiation, the diazonium and/or polymer coating thereof becomes softened or increased in solubility. After either of these types of plates is thus imaged by exposure to actinic radiation, it is developed by applying thereto a developer which is a solvent for the unexposed polymer and/or diazonium material and thereafter removing the developer together with the solubilized polymer and/or diazonium material. The thus developed plates will accept ink where the polymer and/or diazonium coating remains and will reject ink where the coating has been dissolved and removed by the developer. Typically, a finisher is then applied to the developed lithographic printing plate in order to protect the non-image areas and to condition the image area of the plate to maintain ink receptivity while the plate is stored prior to actual printing therewith.

A serious drawback of most lithographic plate finishers is the appearance of a blinding condition over the image area caused by including within finisher formulations a resin such as gum arabic, which is the most widely used finishing agent. Highly viscous resins such as gum arabic tend to lay an uneven, streaky film, especially when applied by a mechanical plate processor, that thereby can "blind" the image area. Known synthetic gum finisher formulations can also cause blinding problems unless they are applied with extreme care and dexterity at a level of skill that is usually not attainable by a mechanical plate processor. Additionally, many plate finishers are specially formulated for use on lithographic plates having a particular coating chemistry, which significantly limits the usefulness of such finishers with respect to exposed plates other than those of such special formulation.

A disadvantage of emulsion finishers, such as those of U.S. Pat. No. 4,162,920, is that they tend to separate on storage and when applied to imaged lithographic plates thereby hampering their usefulness in finishing plates while avoiding blinding, scumming and extended roll-up cycles. Emulsion finishers also have a cost disadvantage when compared with aqueous finishers that include larger relative quantities of water within the finisher compositions.

Accordingly, there is a need for a single-phase aqueous finisher composition having high quantities of water that will finish a wide variety of image lithographic plates by desensitizing and preserving the hydrophilic non-image areas and protecting the oleophilic image areas while substantially eliminating blinding and scumming and while accomplishing acceptable roll-up through a minimal number of cycles. These and other advantageous properties are provided by the finisher and preserver according to this invention which is a single-phase aqueous composition including a blend of natural and synthetic hydrophilic resins, a preservative for such natural resin, a buffer system of phosphate and phosphoric acid, a surfactant composition that is preferably a particular blend of surfactants, and at least about 85% water, based on the total weight of the aqueous composition.

It is, therefore, a general object of the present invention to provide an improved aqueous finisher composition for lithographic plates.

Another object of the present invention is to provide a single-phase, aqueous finisher and preserver for a wide variety of lithographic plates having any of various coating compositions responsive to actinic radiation.

Another object of this invention is to provide an aqueous finisher composition having a low viscosity and exhibiting good flow properties.

Another object of the present invention is to provide an improved plate finisher and preserver that affords exceptionally rapid roll-up of imaged lithographic plates treated therewith.

Another object of this invention is an improved finisher and preserver composition that exhibits a broad temperature and pH stability over the range of temperature and pH values typically encountered during commercial printing operations.

Another object of this invention is an improved finisher and preserver that has an indefinite shelf life, that buffs up dry and clear when used on an imaged lithographic plate, and that does not dry up within a lithographic plate processing machine.

Another object of the present invention is an improved aqueous composition that finishes and preserves imaged lithographic plates to the extent that they can be stored for greater than eight weeks without evidence of blinding or scumming.

Another object of this invention is an improved finisher and preserver for lithographic plates that does not clog holes within the spray tubes of mechanical plate processors and that does not harden and cake within the processor.

Another object of this invention is to provide an improved single-phase aqueous finisher and preserver composition for lithographic plates that is compatible with a wide variety of press fountain solutions.

These and other objects of this invention will be apparent from the following further detailed description thereof.

The finisher and preserver composition in accordance with this invention is a single-phase aqueous composition including between about 2 and 12 total weight percent, preferably between about 3 and 8 weight percent, of a blend of natural gum and synthetic hydrophilic resins, between about 0.05 and about 1 weight percent of a preservative for such natural resin, between about 0.5 and about 5 weight percent of a phosphate and phosphoric acid buffer system, between about 0.01 and about 0.2 weight percent of a surfactant composition, and between about 85 and 95 weight percent water, all percentages being based upon the total weight of the single-phase aqueous composition.

Such blend of natural and synthetic resins includes a natural gum resin such as gum arabic which, if used alone, would readily lead to blinding problems. It has been discovered that by blending a natural gum resin such as gum arabic with certain synthetic resins, a resin blend is provided which is hydrophilic for protecting non-image areas from oxidation and scumming while simultaneously preventing image-area blinding and poor roll-up that is often associated with compositions containing a single resin. A particularly advantageous blend is that of between about 1 and 5 weight percent, preferably between about 2 and 4 weight percent, of a natural gum resin, together with between about 0.5 and 5 weight percent, preferably between about 0.8 and 3 weight percent, and most preferably between about 1 and 2 weight percent of a cyclic amide synthetic resin between about 0.1 and 2 weight percent, preferably between about 0.3 and 1 weight percent of a modified polyacrylamide synthetic resin. While the synthetic resins alone do not adequately protect the non-image areas of the exposed plate, they do improve the water solubility of the resin blend, enhance the breadth of the temperature and pH stability of the overall composition, and combine with other compounds of the composition to increase the stability of the single-phase composition.

Because of its ready availability and wide acceptance, gum arabic is the preferred natural resin, and the preferred synthetic resins are of the cyclic amide type and of the hydrolyzed polyacrylamide type. Especially preferred are polyvinyl pyrollidone and a polyacrylamide synthetic resin of a molecular weight on the order of about 200,000 that is between about 60 and 70 percent hydrolyzed to acrylic acid groups. Especially preferred is the combination of these two types of synthetic resins with the natural resin, the preferred formulation being one having 6 parts by weight of gum arabic, 3 parts by weight of polyvinyl pyrollidone, and 1 part by weight of an approximately 70% hydrolyzed polyacrylamide.

Preservatives are preferably included within the composition in order to protect the composition from growth of molds which tends to occur in formulations incorporating natural gums or resins. Such preservatives are included in a mold growth-inhibiting amount; for example, a preservative such as the preferred sodium benzoate, which is especially desirable because it does not pose any pollution problems, will typically be present within the formulation within a range of between about 0.05 to about 1 weight percent, preferably between about 0.1 and about 0.5 weight percent, based upon the weight of the total composition.

In order to maximize the stability of the total composition, a buffering system is provided for reducing the likelihood of undesirable precipitation by maintaining the pH of the composition to within close tolerances. The buffering system in accordance with this invention also assists in desensitizing the non-image areas in order to prevent undesirable ink adherence and scumming, while preferably also being effective as a plate cleaner. All such properties are imparted to the finisher and preserver composition of this invention when it incorporates a buffer system combining a phosphate and phosphoric acid, the preferred buffering system being a combination of monosodium phosphate, trisodium phosphate, and 85% phosphoric acid.

The concentration of the buffering system will vary somewhat depending upon what pH is needed to enhance the stability of any particular specific formulation of the finisher and preserver composition according to this invention; for example, the preferred pH for a particular advantageous composition formulation is a pH of 4.3, and the preferred buffering system maintains the pH between about 4.1 and 4.5 under normal storage and use conditions. In addition to accomplishing this needed pH control, the buffering system according to this invention also assists, particularly by the inclusion of trisodium phosphate at its preferred concentration ratio, in the plate cleaning aspects of this invention; the buffering system further aids, particularly by the inclusion of phosphoric acid at its preferred concentration ratio, in desensitizing the non-image areas of the exposed plate and maintaining them hydrophilic as well as in preventing ink adherence and scumming. Particularly preferred is a buffering system including monosodium phosphate, trisodium phosphate and phosphoric acid at a weight ratio of 1:3:3 within an overall concentration range of between about 0.5 and 5 weight percent, preferably between about 1 and 3 weight percent of the total aqueous composition, the concentration of monosodium phosphate generally ranging between about 0.1 and 0.5 weight percent, and the concentration of each of trisodium phosphate and phosphoric acid generally ranging between about 0.3 and 2 weight percent thereof.

Surfactants are typically included within the composition, preferably those having low foaming properties and good wetting capabilities, especially with respect to the image-area polymeric materials, in order to enhance the uniformity of the finisher and preserver coating of this invention onto the imaged lithographic plate to assist in protecting the non-image areas of the exposed plate. Suitable low foaming or non-foaming surfactants include modified linear alcohol ethoxylates and modified aliphatic polyethers, preferably in combination with each other at a weight ratio on the order of 1:1 and which are typically present within the composition of this invention at a total concentration of between about 0.01 and 0.2 weight percent, preferably between about 0.02 and 0.1 weight percent.

In proceeding with the method according to this invention, a natural gum resin and one or more synthetic resins are blended into water until the natural and synthetic resins are substantially totally dissolved therewithin. Typically, the total natural and synthetic blend of resins will be dissolved within water at a weight ratio of between about 1:50 and about 1:6. The remaining compounds of the composition, including the phosphate and phosphoric acid buffering system, the surfactant constituent, and the preserver compound, are usually more water soluble than the natural and synthetic resins, and these may be added directly to the water within which the natural and synthetic resin blend is dissolved or they may be incorporated into a smaller volume of water for subsequent combination with the dissolved resin blend aqueous system. By this method, a single-phase aqueous solution is prepared which includes between about 2 and 12 weight percent of a blend of natural and synthetic resins, between about 0.05 and about 1 weight percent of a preserver compound for the natural resin, between about 0.5 and about 5 weight percent of a phosphate and phosphoric acid buffering system blend, between about 0.01 and about 0.2 weight percent of a low-foaming surfactant constituent and between about 85 to about 95 weight percent water, all percentages being based upon the weight of the total aqueous composition.

In use, the composition is applied to an exposed and developed lithographic plate. When such application is made by hand, preferably a small amount thereof is poured onto the plate and is spread with a webril wipe or a damp sponge, after which the plate is preferably thoroughly buffed dry with a clean, absorbent wiping cloth or pad. When the finisher and preserver composition is used within a mechanical plate processor, the composition is added to the proper level within the finisher reservoir of the machine. During operation of the machine, the compositions do not foam undesirably upon agitation, and they spread uniformly over the imaged and developed lithographic plate by the brushes or sponges of the particular mechanical plate processor being used. The compositions will not dry up in these processors, and since they possess a relatively low viscosity, on the order of 20–25 centipoises, they will not clog spray tubes within the processor, even when the processor has been shut down for extended time periods while the composition of this invention is left therewithin.

Compositions prepared according to this invention have an indefinite shelf life, and will remain in storage within the bottle for two to three years without evidence of mold growth, without substantial separation of the single phase, and without evidence of component hydrolyzation. When used on the plates in accordance with the method of this invention, the imaged, developed and finished plates are preserved to prevent deterioration or damage of the image areas and to maintain the desensitization of the non-image areas, such preservation being effective for on the order of three months without evidence of blinding or scumming upon printing with such plates.

The following specific examples will more precisely illustrate the invention and teach the procedures presently preferred for practicing the same, as well as the improvements and advantages realized thereby.

EXAMPLE I

Various natural and synthetic resins were incorporated, alone or in combination, into finisher compositions also including a surfactant, sodium benzoate, phosphoric acid, and (in most formulations) trisodium phosphate. Such compositions were used to finish a developed subtractive lithographic plate having a cinnamate polymer layer over a diazonium resin layer, after which press tests were run on a Harris H-125 sheet fed press to check for scumming, blinding and the number of cycles needed for roll-up to a commercially saleable printed product. The results are reported in the following Table, from which it can be seen that scumming, blinding, and/or roll-up were generally less than desirable for all of the listed compositions, whether they included one, two or three natural or synthetic resins, except for the last-reported composition which is formulated in accordance with the present invention, which combination of the natural gum resin and two synthetic hydrophilic resins in admixture brought about significantly enhanced reductions in scumming and blinding and enhanced roll-up properties when compared with the use of each resin singly.

The last composition reported in the Table, which included about 94 weight percent deionized water, about 3 weight percent gum arabic resin, about 1.5 weight percent polyvinyl pyrollidone, about 0.5 weight percent hydrolyzed polyacrylamide, about 0.75 weight percent trisodium phosphate, about 0.25 weight percent of 85% phosphoric acid, about 0.15 weight percent of sodium benzoate, and about 0.1 weight percent of a modified linear alcohol ethoxylate low-foam surfactant, was tested within three different plate processing machines, the Kodak processor, the Tasope processor, and the National processor. Although this particular formulation was generally quite acceptable, it did not uniformly wet the image areas on a consistent basis, leaving an "alligator" type of pattern on the finished plate.

TABLE

| Resins | Total wt. % Resin(s) Solids | pH | Brookfield Viscosity (cps) | Press Test (one week aging at room temperature) | Press Test (two week aging at room temperature) |
|---|---|---|---|---|---|
| Dextrin Tapioca Gums | Approx. 5.0 | 4.30 | 13.50 | Scum after 3rd cycle Sl. blind to 10th cycle | — |
| Dextrin Tapioca Gums | Approx. 5.0 | 2.20* | 20.00 | Scum after 1st cycle Sl. blind to 10th cycle | — |
| Gantrez S-95[1] | Approx. 5.0 | 3.70 | 49.50 | Scum after 13th cycle No blinding | — |
| Gantrez S-95 | Approx. 5.0 | 2.80* | 37.00 | Scum after 4th cycle Sl. blind to 10th cycle | — |
| PVP[2] | Approx. 5.0 | 4.10 | 14.50 | Scum before 1st cycle Heavy blinding | — |
| PVP | Approx. 5.0 | 2.40* | 13.50 | Scum at 1st cycle Sl. blind to 10th cycle | — |
| Dextrins-125[3] | Approx. 5.0 | 4.20 | 15.50 | Scum after 2nd cycle Heavy blinding | — |
| Dextrins-125 | Approx. 5.0 | 2.20* | 28.50 | Scum at 1st cycle Blinding to 10th cycle | — |
| Stractan-2[4] | Approx. 5.0 | 4.40 | 15.00 | Scum after 4th cycle Blind to 10th cycle | — |
| Stractan-2 | Approx. 5.0 | 2.30* | 12.50 | Scum at 1st cycle Blind to 10th cycle | — |
| Gum Arabic | Approx. 5.0 | 4.20 | 19.50 | No scuming after 30th cycle, Blind to 5th cycle | Scummed on inking |
| Gum Arabic | Approx. 5.0 | 2.60* | 17.50 | No scumming after 30th cycle, Blind to 10th cycle | — |
| Purity Gum 1773 | 11.5 | 2.5 | 18.5 | **Showed scum on inking | — |
| Stractan-2 | 11.5 | 2.5 | 39.0 | **Discontinuous coating film Showed scum on inking | — |
| Polyacrylamide[5] | 2.9 | 2.5 | 58.0 | **Showed scum on inking | |
| PVP | 10.0 | 4.6 | 21.0 | **Showed scum on inking | — |
| Na-CMC[6] | 2.5 | 5.0 | 176.0 | **Showed scum on inking | — |

TABLE-continued

| Resins | Total wt. % Resin(s) Solids | pH | Brookfield Viscosity (cps) | Press Test (one week aging at room temperature) | Press Test (two week aging at room temperature) |
|---|---|---|---|---|---|
| Dextrin Tapioca/ Gantrez S-95 (3:1) | Approx. 5.0 | — | — | No scum, Blind to 10th cycle | Scummed on inking |
| Dextrin Tapioca/ PVP (3:1) | Approx. 5.0 | — | — | Scum after 2nd cycle, Blind to 5th cycle | Scummed on inking |
| Dextrins-125/ Gantrez S-95 (3:1) | Approx. 5.0 | — | — | Sl. scum at 30th cycle Blind to 5th cycle | Scummed on inking |
| Dextrins-125/ PVP (3:1) | Approx. 5.0 | — | — | Scum after 2nd cycle Blind to 5th cycle | Scummed on inking |
| Stractan-2/ Gantrez S-95 (3:1) | Approx. 5.0 | — | — | No scum Slight blinding | Scummed on inking |
| Stractan-2/ PVP (3:1) | Approx. 5.0 | — | — | Scum after 10th cycle Blind to 5th cycle | Scummed on inking |
| Gum Arabic/ Gantrez S-95 (9:1) | Approx. 5.0 | 4.20 | 24.00 | Scum at 10th cycle Slight blinding | Scummed on inking |
| Gum Arabic/ Gantrez S-95 (3:1) | Approx. 5.0 | 4.20 | 27.00 | Scum at 5th cycle Slight Blinding | Scummed on inking |
| Gum Arabic/ Gantrez S-95 (1:1) | Approx. 5.0 | 4.20 | 35.00 | No scumming No blinding | Scummed on inking |
| Gum Arabic/ PVP (9:1) | Approx. 5.0 | 4.40 | 19.00 | No scumming Slight blinding | Scummed on inking |
| Gum Arabic/ PVP (3:1) | Approx. 5.0 | 4.40 | 18.00 | No scumming Slight blinding | Scummed on inking |
| Gum Arabic/ PVP (1:1) | Approx. 5.0 | 4.20 | 19.00 | No scumming Slight blinding | Scummed on inking |
| Gum Arabic/ Gantrez S-95/ Polyacrylamide[7] (4:1:1) | 9.5 | <4.0 | (***) | No scum after 30 cycles Poor roll-up | — |
| Gum Arabic/ Gantrez S-95/ Polyacrylamide[7] (4:3:1) | 9.5 | <4.0 | (***) | No scum after 30 cycles Poor roll-up | — |
| Gum Arabic/ Gantrez S-95/ Polyacrylamide[7] (6:3:1) | 5.0 | 4.1 | 29.00 | No scum on inking ****Scummed; poor roll-up and blinding | Showed scum on inking, Blind to 3rd cycle |
| Gum Arabic/ Gantrez S-95/ Polyacrylamide[7] (Approx. 6:3:1) | 3.25 | 4.3 | 25.00 | No scum on inking; ****Scummed; poor roll-up and blinding | Showed scum on inking, Blind to 3rd cycle |
| Gum Arabic/ Gantrez S-95/ Polyacrylamide[7] (6:3:1) | 5.0 | 4.2 | 29.00 | No scum on inking; poor roll-up and blinding ****Scummed; poor roll-up and blinding | Showed scum on inking, Blind to 3rd cycle |
| Gum Arabic/ Gantrez S-95/ Polyacrylamide[7] (7:2:1) | 5.0 | 4.2 | — | No scum on inking; poor roll-up and blinding ****Scummed; poor roll-up and blinding | Showed scum on inking |
| Gum Arabic/ Gantrez S-95/ Polyacrylamide[7] (8:1:1) | 5.0 | 4.2 | — | No scum on inking; poor roll-up and blinding **** Scummed; poor roll-up and blinding | Showed scum on inking |
| Gum Arabic/ PVP Polyacrylamide[7] (6:3:1) | 5.0 | 4.3 | 23.00 | No scum on inking; good roll-up and blinding, ****No scumming; Roll-up by 1st scum cycle | No scumming |

*trisodium phosphate was omitted from these compositions.
**Three day aging only (at room temperature).
***Solution separated overnight and had to be redispersed.
****One week in humidity chamber at 90° F. and 60% relative humidity.
[1]A hydrolyzed, low molecular weight polymer of poly(methylvinyl ether/maleic acid). (GAF Corporation)
[2]Polyvinyl pyrollidone is the principal constituent.
[3]Partially hydrolyzed corn starch derivative. (A.E. Staley Company)
[4]A 90% long branched polysaccharide arabinogalactan. (St. Regis Company)
[5]A modified, hydrolyzed polyacrylamide of low carbonyl content, mol. wt. 200,000, average.
[6]Carboxymethyl cellulose sodium salt.
[7]A modified, hydrolyzed polyacrylamide of moderately high carbonyl content, mol. wt. 200,000, average.

EXAMPLE II

The last-reported composition of Example I was further modified to combine the low foaming surfactant of that formulation (which has been found to be the only surfactant of over thirty tested that clearly wetted the image-area polymer) with a modified aliphatic polyether surfactant (which was found to have, by itself, no polymer wetting capability), with the result that the "alligator" type of patterns observed in the Example I formulations were eliminated, and it was possible to reduce the total amount of surfactant included within the composition to a total amount of about 0.04 weight percent surfactant based upon the total weight of the aqueous composition, being composed of about 0.02 weight percent of the modified linear alcohol ethoxylate surfactant and about 0.02 weight percent of the modified aliphatic polyether surfactant. Additive and subtractive lithographic plates manufactured by Richardson Graphics Company and subtractive plates manufactured by Kodak, Enco, 3M Company and Polychrome were finished either by hand or in a mechanical processor, or both, with the finisher of this Example. They were then stored at 40° F. and at a relative humidity of 60% for eight weeks, after which they were tested on the Harris L-125 press and found to effectively control scumming when run through conventional scum cycle tests, to avoid any substantial blinding problems, and to roll-up by 5 cycles or less into a printed product of commercially acceptable quality.

While in the foregoing specification, certain embodiments and examples of this invention have been described in detail, it will be appreciated that modifications and variations therefrom will be apparent to those skilled in the art; accordingly, this invention is to be limited only by the scope of the appended claims.

We claim:

1. A finisher and preserver for lithographic plates comprising a single-phase aqueous composition consisting essentially of:

a blend of natural gum resin and synthetic hydrophilic resins in a total amount of between about 2 and 12 weight percent, based on the total weight of the aqueous composition, said resin blend including between about 1 and about 5 weight percent of the natural gum resin, between about 0.5 and about 5 weight percent of a cyclic amide synthetic hydrophilic resin, and between about 0.1 and about 2 weight percent of a polyacrylamide synthetic hydrophilic resin, all based on the total weight of the aqueous composition, wherein said resin blend includes a ratio of about 6 parts by weight of the natural gum resin, to about 3 parts by weight of the cyclic amide synthetic hydrophilic resin, to about 1 part by weight of the polyacrylamide synthetic hydrophilic resin, between about 0.05 and about 1 weight percent of a preservative for said natural resin, based on the total weight of the aqueous composition, a buffering system of phosphate and phosphoric acid, said buffering system being between about 0.5 and about 5 weight percent based on the total weight of the aqueous composition, a surfactant constituent in a total amount of between about 0.01 and about 0.2 weight percent, based on the total weight of the aqueous composition, and between about 85 and 95 weight percent water, based on the total weight of the aqueous composition, each of said blend of resins, preservatives, buffering system and surfactant constituent being in admixture with each other and being dissolved in said water in a single phase.

2. The finisher and preserver composition of claim 1, wherein said resin blend includes gum arabic as the natural gum resin and a modified polyacrylamide as the polyacrylamide synthetic resin.

3. The finisher and preserver composition of claim 1, wherein said resin blend includes polyvinylpyrrolidone as the cyclic amide synthetic hydrophilic resin.

4. The finisher and preserver composition of claim 1, wherein said polyacrylamide synthetic hydrophilic resin is partially hydrolyzed.

5. The finisher and preserver composition of claim 1, wherein said resin blend includes polyvinylpyrrolidone as the cyclic amide synthetic hydrophilic resin and a partially hydrolyzed polyacrylamide synthetic resin as the polyacrylamide synthetic hydrophilic resin.

6. The finisher and preserver composition of claim 1, wherein said resin blend includes gum arabic, polyvinyl pyrollidone, and a partially hydrolyzed polyacrylamide synthetic resin.

7. The finisher and preserver composition of claim 1, wherein said resin blend comprises between about 3 and 8 weight percent of the total aqueous composition.

8. The finisher and preserver composition of claim 1, wherein said preservative is sodium benzoate at a growth-inhibiting concentration.

9. The finisher and preserver composition of claim 1, wherein said buffering system includes trisodium phosphate and phosphoric acid.

10. The finisher and preserver composition of claim 1, wherein said buffering system maintains the composition at a pH between about 4.1 and 4.5.

11. The finisher and preserver composition of claim 1, wherein said buffering system includes monosodium phosphate, trisodium phosphate, and phosphoric acid.

12. The finisher and preserver composition of claim 1, wherein said buffering system includes between about 0.3 and 2 weight percent, based on the total weight of the aqueous composition, of each of trisodium phosphate and phosphoric acid.

13. The finisher and preserver composition of claim 1, wherein said buffering system includes monosodium phosphate, trisodium phosphate and phosphoric acid at a weight ratio of 1:3:3, respectively.

14. The finisher and preserver composition of claim 1, wherein said surfactant constituent includes generally equal parts by weight of an ethoxylate and of a polyether, and the total concentration of the surfactant constituent is between about 0.02 and 0.1 weight percent.

15. The finisher and preserver composition of claim 1, wherein said surfactant constituent includes a modified linear alcohol ethoxylate.

16. The finisher and preserver composition of claim 1, wherein said surfactant constituent includes a blend of a modified linear alcohol ethoxylate and a modified aliphatic polyether.

17. The finisher and preserver composition of claim 1, wherein said composition has a viscosity between about 20 and about 25 centipoises.

* * * * *

UNITED STATES PATENT AND TRADEMARK OFFICE

CERTIFICATE OF CORRECTION

PATENT NO. : 4,400,481

DATED : August 23, 1983

INVENTOR(S) : Sunit S. Dixit and William V. Stansky

It is certified that error appears in the above–identified patent and that said Letters Patent are hereby corrected as shown below:

At Column 1, line 38, "area" should read --areas--.

At Column 1, line 68, "image" should read --imaged--.

At Column 3, lines 16-17, "resin between" should read --resin and between--.

At Column 4, lines 2-3, "particular" should read --particularly--.

Signed and Sealed this

*Thirteenth* Day of *December 1983*

[SEAL]

*Attest:*

GERALD J. MOSSINGHOFF

*Attesting Officer* *Commissioner of Patents and Trademarks*